(12) United States Patent
Carter et al.

(10) Patent No.: US 12,317,877 B2
(45) Date of Patent: Jun. 3, 2025

(54) CHUM BOBBER

(71) Applicant: Chumbobber Unlimited LLC, Tomball, TX (US)

(72) Inventors: Stephen Dale Carter, Nicholasville, KY (US); Phillip Brent Carter, Tomball, TX (US); Kevin Clark Jones, Hideaway, TX (US)

(73) Assignee: Chumbobber Unlimited LLC, Tomball, TX (US)

( * ) Notice: Subject to any disclaimer, the term of this patent is extended or adjusted under 35 U.S.C. 154(b) by 0 days.

(21) Appl. No.: 18/202,804

(22) Filed: May 26, 2023

(65) Prior Publication Data

US 2024/0049696 A1 Feb. 15, 2024

Related U.S. Application Data

(60) Provisional application No. 63/368,881, filed on Aug. 12, 2022.

(51) Int. Cl.
*A01K 97/02* (2006.01)
*A01K 93/00* (2006.01)

(52) U.S. Cl.
CPC .............. *A01K 97/02* (2013.01); *A01K 93/00* (2013.01)

(58) Field of Classification Search
CPC ................................. A01K 97/02; A01K 93/00
USPC .................. 43/44.99, 44.87, 44.94, 44.95
See application file for complete search history.

(56) References Cited

U.S. PATENT DOCUMENTS

| | | | | |
|---|---|---|---|---|
| 2,163,483 A | * | 6/1939 | Carlisle | A01K 93/00 5/98.3 |
| 2,465,127 A | * | 3/1949 | Stark | A01K 97/02 43/44.99 |
| 2,612,718 A | * | 10/1952 | Steinberg | A01K 97/02 43/44.99 |
| 2,634,540 A | * | 4/1953 | Nelson | A01K 83/06 43/44.4 |
| 2,709,317 A | * | 5/1955 | Pease, Sr. | A01K 97/02 43/44.99 |
| 2,713,744 A | * | 7/1955 | Strausser, Sr. | A01K 97/02 239/57 |
| 2,720,720 A | * | 10/1955 | Landrum | A01K 93/00 43/43.11 |
| 2,820,317 A | * | 1/1958 | Irwin | A01K 93/00 43/43.14 |
| 2,842,888 A | * | 7/1958 | Landrum | A01K 93/00 D22/146 |

(Continued)

FOREIGN PATENT DOCUMENTS

DE 29717766 U1 * 11/1997 ............. A01K 97/02
EP 1721521 A1 * 11/2006 ............. A01K 97/02

(Continued)

*Primary Examiner* — Darren W Ark
(74) *Attorney, Agent, or Firm* — Bayou IP PLLC; Michael Spradley (57) ABSTRACT

A chum bobber with a first member comprising an integrated buoyancy chamber and a first coupling apparatus and a second member comprising a chum chamber and a second coupling apparatus for physically coupling to the first coupling apparatus. The first and second coupling apparatus are adapted for coupling the first member and the second member and thereby trapping chum into the second member while isolating the chum from the first member.

10 Claims, 6 Drawing Sheets

(56) References Cited

U.S. PATENT DOCUMENTS

| | | | | |
|---|---|---|---|---|
| 2,844,907 A * | 7/1958 | Merton | A01K 97/02 | 43/44.99 |
| 2,895,255 A * | 7/1959 | Irwin | A01K 93/00 | 43/44.88 |
| 3,084,471 A * | 4/1963 | Alspaugh | A01K 97/02 | 43/44.99 |
| 3,608,229 A * | 9/1971 | Ross | A01K 93/00 | 43/43.15 |
| 3,753,309 A * | 8/1973 | Bryant | A01K 97/02 | 43/43.11 |
| 3,769,740 A * | 11/1973 | Lang | A01K 97/02 | 43/44.99 |
| 3,780,467 A * | 12/1973 | Lueck | A01K 93/00 | 43/44.87 |
| 3,866,346 A * | 2/1975 | Schneider | A01K 93/00 | 43/44.87 |
| 3,918,193 A * | 11/1975 | Schneider | A01K 93/00 | 43/43.1 |
| 3,974,591 A * | 8/1976 | Ray | A01K 91/06 | 43/44.99 |
| 4,051,620 A * | 10/1977 | Yasuda | A01K 97/02 | 43/44.99 |
| 4,563,831 A * | 1/1986 | Gibney | A01K 93/00 | 43/44.87 |
| 4,603,502 A * | 8/1986 | MacDonald | A01K 83/06 | 43/44.99 |
| 4,799,328 A | 1/1989 | Goldman | | |
| 4,817,327 A * | 4/1989 | DeKay | A01K 97/06 | 43/43.15 |
| 4,924,620 A * | 5/1990 | Kimberley | A01K 97/02 | 43/44.99 |
| 5,033,227 A * | 7/1991 | Coxwell | A01K 97/02 | 43/44.99 |
| 5,107,617 A * | 4/1992 | Pendleton | A01K 97/02 | 43/44.99 |
| 5,129,178 A * | 7/1992 | Hicks | A01K 93/00 | 43/44.87 |
| 5,131,183 A * | 7/1992 | Thayer | A01K 91/053 | 43/44.4 |
| 5,329,722 A * | 7/1994 | Wilson | A01K 93/00 | 43/44.87 |
| 5,428,921 A * | 7/1995 | Lancieri | A01K 97/02 | 43/44.99 |
| 5,617,669 A * | 4/1997 | Levey | A01K 97/02 | 43/44.99 |
| 5,651,209 A * | 7/1997 | Rainey | A01K 97/00 | 43/44.99 |
| 5,729,928 A * | 3/1998 | Anderson | A01K 97/02 | 43/44.99 |
| 6,516,554 B1 * | 2/2003 | Page | A01K 97/02 | 43/44.99 |
| 6,836,997 B2 * | 1/2005 | Cramsey | A01K 85/00 | 43/42.22 |
| 7,043,870 B1 * | 5/2006 | Sydow | A01K 91/06 | 43/44.99 |
| 7,082,711 B2 * | 8/2006 | Adams | A01K 93/02 | 43/17.5 |
| 7,503,141 B1 * | 3/2009 | Leeman | A01K 97/02 | 43/44.99 |
| 7,565,763 B1 | 7/2009 | Ruzicka | | |
| 8,474,174 B2 * | 7/2013 | Norman | A01K 85/01 | 43/44.87 |
| 9,867,365 B1 * | 1/2018 | Rosenbloom | A01K 95/02 | |
| D858,687 S * | 9/2019 | LaRoy | D22/136 | |
| D939,041 S * | 12/2021 | Boyette | D22/136 | |
| 11,375,700 B2 * | 7/2022 | Boyette | A01K 97/04 | |
| 11,399,524 B2 * | 8/2022 | Caldeira | A01K 85/018 | |
| 2004/0068916 A1 * | 4/2004 | Harris | A01K 97/02 | 43/44.99 |
| 2005/0120615 A1 * | 6/2005 | Morken | A01K 93/00 | 43/44.9 |
| 2007/0094914 A1 * | 5/2007 | Glynn | A01K 91/04 | 43/42.24 |
| 2007/0199235 A1 * | 8/2007 | Yu | A01K 95/00 | 43/44.99 |
| 2008/0313949 A1 * | 12/2008 | Lee | A01K 93/00 | 43/43.13 |
| 2009/0049735 A1 * | 2/2009 | Westover | A01K 85/08 | 43/44.87 |
| 2009/0255164 A1 * | 10/2009 | Jones | A01K 97/02 | 43/4.5 |
| 2010/0058641 A1 * | 3/2010 | Lee | A01K 93/00 | 43/17 |
| 2012/0246996 A1 * | 10/2012 | Bennis | A01K 93/02 | 43/17 |
| 2014/0053448 A1 * | 2/2014 | Kapolnek | A01K 97/05 | 43/4.5 |
| 2015/0075057 A1 * | 3/2015 | Korunsky | A01K 97/02 | 43/42.06 |
| 2016/0192631 A1 * | 7/2016 | Jenkins | A01K 85/01 | 43/4.5 |
| 2016/0309691 A1 * | 10/2016 | Ancona | A01K 91/03 | |
| 2017/0290310 A1 * | 10/2017 | Knowles | A01K 93/00 | |
| 2018/0184690 A1 * | 7/2018 | Richards | A01K 61/85 | |
| 2020/0068865 A1 * | 3/2020 | Kahl | A01K 95/00 | |
| 2021/0337778 A1 * | 11/2021 | Boyette | A01K 97/02 | |
| 2023/0075869 A1 * | 3/2023 | Knickrehm | A01K 87/008 | |
| 2024/0032521 A1 * | 2/2024 | Ellwood | A01K 97/02 | |
| 2024/0065245 A1 * | 2/2024 | Carlson | A01K 91/047 | |

FOREIGN PATENT DOCUMENTS

| | | | | |
|---|---|---|---|---|
| EP | 1800538 A1 * | 6/2007 | | A01K 91/06 |
| EP | 3066921 A1 * | 9/2016 | | A01K 91/06 |
| EP | 3556207 A1 * | 10/2019 | | A01K 97/02 |
| FR | 2466191 A1 * | 4/1981 | | |
| FR | 3062027 B3 * | 8/2019 | | A01K 97/02 |
| FR | 3119967 A1 * | 8/2022 | | |
| GB | 2446466 A * | 8/2008 | | A01K 97/02 |
| GB | 2531262 A * | 4/2016 | | A01K 97/02 |
| GB | 2609412 A * | 2/2023 | | A01K 85/00 |
| JP | H0638570 U * | 5/1994 | | |
| KR | 200441755 Y1 * | 9/2008 | | |
| KR | 100888094 B1 * | 3/2009 | | |
| WO | WO-0036981 A1 * | 6/2000 | | A61N 7/00 |
| WO | WO 2004/036981 | 5/2004 | | |
| WO | WO-2004036981 A2 * | 5/2004 | | A01K 97/02 |

* cited by examiner

CHUM BOBBER

RELATED APPLICATIONS

This application claims priority to U.S. patent application 63/368,881, Aug. 12, 2022, entitled "Chum Bobber," which is hereby incorporated fully herein by reference.

BACKGROUND

The example embodiments relate to chum fishing.

Chumming is a technique that attracts fish, typically in connection with fishing. Chumming, or to chum, is achieved by providing a volume of fish-attractive material (e.g., bait) into water to attract fish to a certain location. Chumming may be used in either fresh or salt water fishing. In a rudimentary manner, chum may be introduced into the water simply by throwing the chum into the water, for example from a boat or pier. In an alternative approach, devices may be used to hold a chum volume in the water, where portions of the chum separate from the volume and distribute into the water. Such devices may be as simple as bags, or may be more complicated devices such as bobbers that release chum and that also may connect to, or include, a fishing hook. One example of such a bobber is shown in U.S. Pat. No. 2,844,907, entitled "Fish Chum Dispenser" (the '907 patent). The '907 patent illustrates what appears to be a multi-part chum bobber including a body 10 with an upper part 11, a lower part 12, and a closure member 21. The closure member 21 threadably cooperates with the interior edge of the lower part 12 and thereby retains chum 13 in the lower part 12. The interior edge of the upper part 11 threadably cooperates with the outer edge of the closure remember 21, so that the closure member 21 is approximately intermediately positioned between the upper part 11 and the lower part 12. Additionally, a separate removal float 20 is retained in place by a holder 15, so that the removable float 20 is positionally affixed within the upper part 11. The body 10 includes perforations through both the upper part 11 and lower part 12, as does the intermediately-positioned closure member 21, so that the entire interior of the device is exposed to water and the particulates the water carries. Moreover, at least three-part, if not more so, assembly and disassembly is required in connection with positioning the chum 13 and removable float 20. Another example of a chum bobber is shown in U.S. Pat. No. 6,516,554, entitled "Combinational Bobber and Chum Dispenser" (the '554 patent). The '554 patent illustrates a chum dispenser 10 with one or more holes 30 at a distal end, with the holes 30 serving as both the entry and exit points for chum 25. While the '554 patent suggests a favorability of reduced expense and "requiring no complex moving parts," it contradicts itself by describing and illustrating a rotatable closure member 34 for adjusting flow of its chum 25 and a wire 40 that is positioned axially through the device. A final example of a chum bobber is shown in U.S. patent application publication 2020/0068865, entitled "Retrievable Chum Dispenser" (the '865 publication). The '865 publication illustrates a chum dispenser 100, with at least three separable parts, namely: (1) an upper shell 110; (2) a lower shell 114; and (3) a removable buoyancy member 126 (shown with options 126A and 126B) that is "complementary in size and shape with the interior compartment of the lower shell 114 and . . . removably received therein." The buoyancy member 126 includes a cavity 130 (130a or 130b) for receiving the chum 134. Accordingly, assembly of this chum dispenser 100 requires at least three separable parts, in addition to its chum, and the buoyancy member 126 consumes a portion of the lower shell 114, which also provides volume for the chum 134.

Examples are described below and that improve upon one or more aspects noted above.

SUMMARY

In one embodiment, there is a chum bobber, comprising a first member comprising an integrated buoyancy chamber and a first coupling apparatus and a second member comprising a chum chamber and a second coupling apparatus for physically coupling to the first coupling apparatus. The first and second coupling apparatus are adapted for coupling the first member and the second member and thereby trapping chum into the second member while isolating the chum from the first member.

Other aspects are described and claimed.

DETAILED DESCRIPTION

The following description, in conjunction with the appended drawings, describe one or more representative example embodiments. Unless otherwise indicated, they are intended to be non-limiting examples for illustrating the principles and concepts of claimed subject matter. Like numbers refer to like elements in the drawings and the description.

Figure 1:
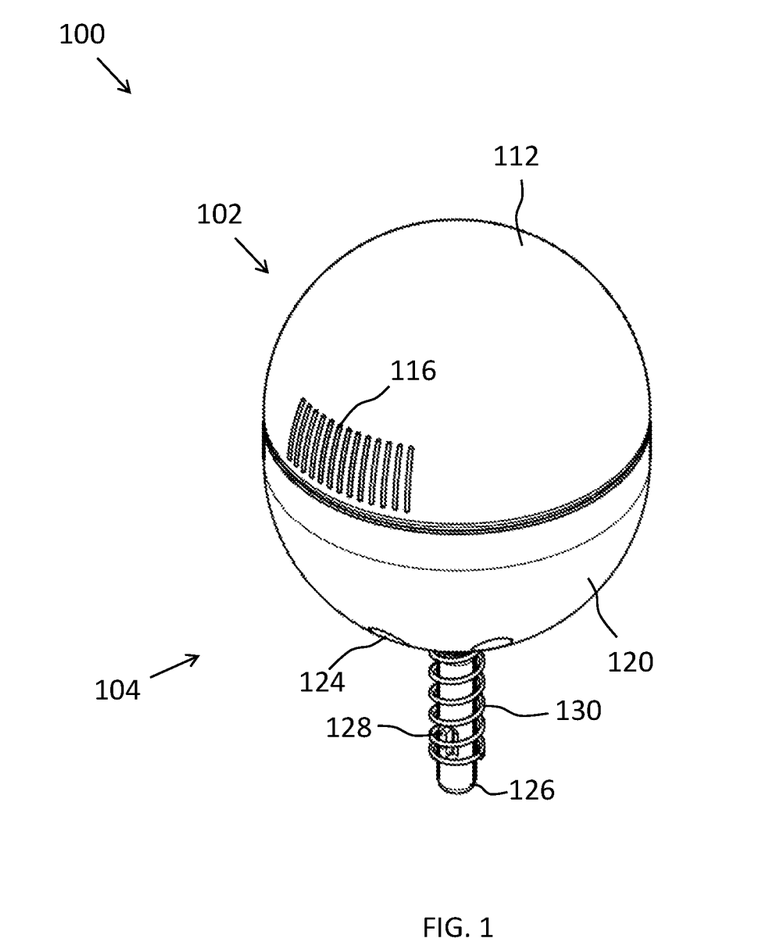
FIG. 1 is an isometric view of a chum bobber 100.
Figure 2:
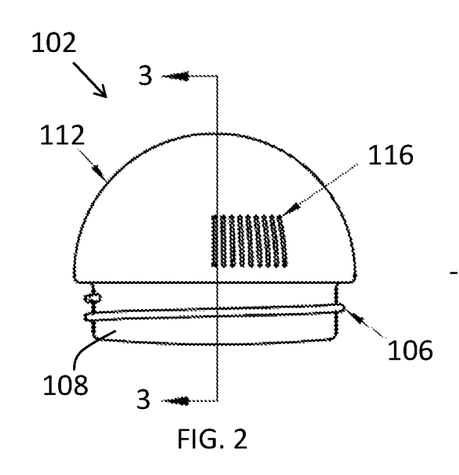
FIG. 2 is a front perspective view of an upper member 102 of the FIG. 1 chum bobber 100.
Figure 3:
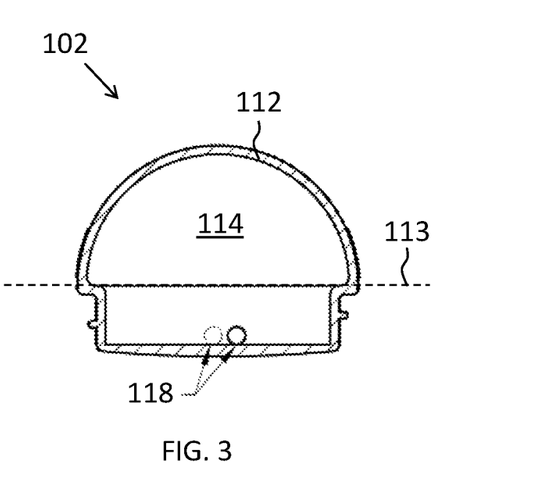
FIG. 3 is a cross-sectional view of the FIG. 2 upper member 102.
Figure 6:
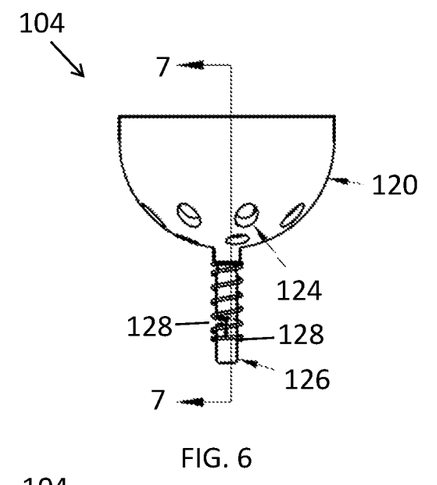
FIG. 6 is a front perspective view of a lower member 104 of the FIG. 1 chum bobber 100.
Figure 7:
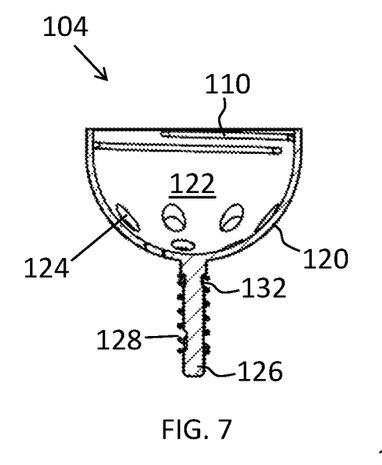
FIG. 7 is a cross-sectional view of the FIG. 6 lower member 104.
Figure 8:
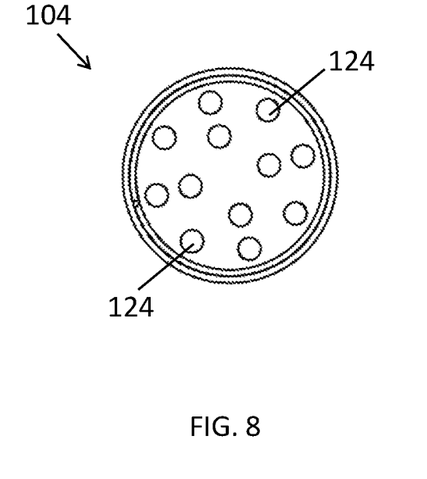
FIG. 8 is a top view of the FIG. 6 lower member 104.
Figure 9:
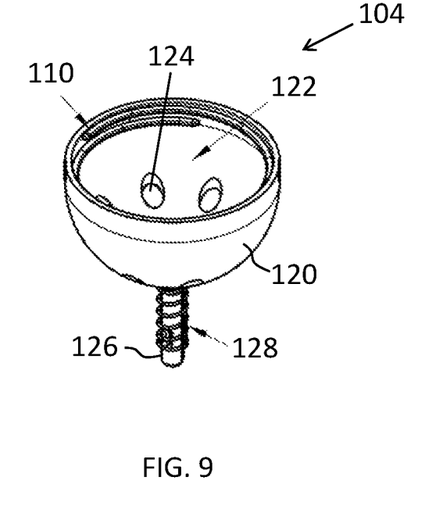
FIG. 9 is an isometric view of the FIG. 6 lower member 104.

FIG. 1 is an isometric view of a chum bobber 100. Generally, the chum bobber 100 includes an upper member 102 and a lower member 104. Each of the upper member 102 and the lower member 104, in an example, is generally hemispherical in outer shape (or includes a hemispherical portion), with an outer diameter in a range from 25 mm to 100 mm. The upper member 102 is shown in additional detail in later figures, including a front perspective view in FIG. 2, a cross-sectional view in FIG. 3, a top perspective view in FIG. 4, and an isometric view in FIG. 5. The lower member 104 is shown in additional detail in later figures, including a front perspective view in FIG. 6, a cross-sectional view in FIG. 7, a top perspective view in FIG. 8, and an isometric view in FIG. 9. The upper and lower members 102 and 104 include a cooperating apparatus so as to affix the two members relative to one another. For example, one or the other of the upper member 102 and the lower member 104 includes a set of male protruding threads, while the other includes a set of female receptacle threads. In the FIGS. 2, 3, and 5 example, the male protruding threads are shown as male threads 106 extending from a flange 108 that protrudes away from an equator 113 of the upper member 102, and in the FIGS. 7, 8, and 9 example, the female receptacle threads are shown as female threads 110 within an interior of the lower member 104. Accordingly, one or the other, or both of, the upper and lower members 102 and 04 may be rotated in opposite directions while the threads 106 and 110 are mated to one another, thereby affixing the members together in a threadable relationship. Conversely, the upper and lower members 102 and 104 may be de-coupled from one another by unscrewing in the opposite direction, for example when needing access to an interior of the lower member 104, as further described below.

Figure 4:
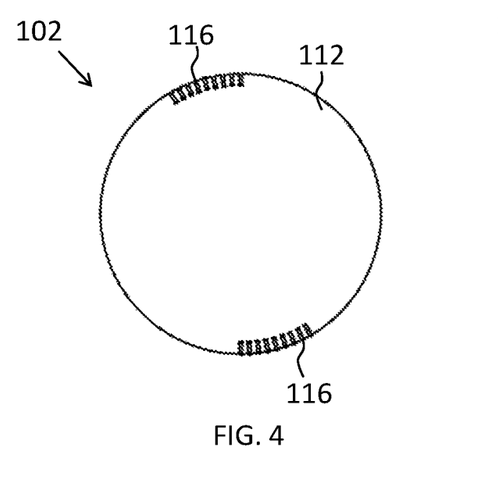
FIG. 4 is a top view of the FIG. 2 upper member 102.
Figure 5:
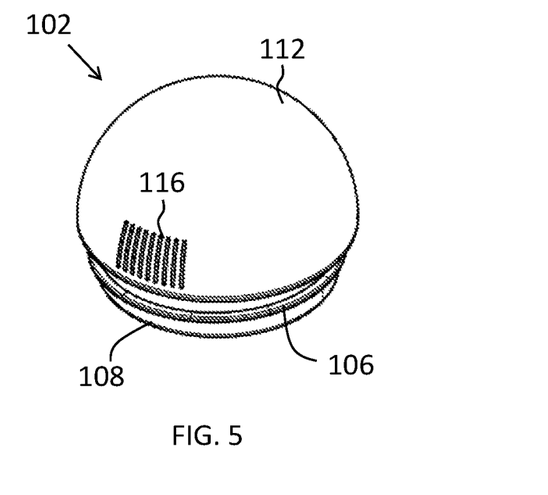
FIG. 5 is an isometric view of the FIG. 2 upper member 102.

Details are now described regarding the upper member 102, as shown in FIGS. 2-5. In an example, the upper member 102 has an exterior wall 112, within which is located a sealed hollow interior space 114. The exterior wall 112 may have a thickness in a range from 1 mm to 2.25 mm. Further, the entirety of the exterior wall 112 may be formed of a same material, such as plastic, for example using a blow molding process, and to fully enclose the sealed hollow interior space 114. Accordingly, when the chum bobber 100 is eventually placed in water (see, for example, FIG. 12), no water can enter into the upper member 102 (or its airtight, sealed hollow interior space 114). Instead, a gas, such as ambient air, is trapped in the sealed hollow interior space 114. Accordingly, the sealed hollow interior space 114 serves as an integrated (inseparable) buoyancy chamber into the upper member 102, thereby giving the upper member 102 buoyancy, and that buoyancy also will support the lower member 104 filled with chum when it is coupled (e.g., screwed together with) to the upper member 102. An outer surface of the exterior wall 112 includes at least one gripping member 116. In an example, the gripping member 116 may include one or more ridges, for example generally parallel to one another, formed within this surface, but not extending through, the exterior wall 112. Also as shown in FIG. 4, the exterior wall 112 may include multiple gripping members 116. Accordingly, when a user assembles the upper and lower members 102 and 104 to one another, such assembly may be facilitated by the user gripping the upper member 102 by contacting his or her hands to the gripping member(s) 116. Lastly, the upper member 102 may include a noise-creating apparatus 118. In the illustrated example, the noise-creating apparatus 118 is accomplished by including one or more loose members, for example metal spheres, within the sealed hollow interior area 114. The metal spheres can be inserted through the blow mold hole after the blow molding process used to form the exterior wall 112 is completed. The blow mold hole would then be subsequently sealed. The metal spheres may have a diameter in a range from 2 mm to 4 mm. Accordingly, as the chum bobber 100 is advanced within water, the metal spheres 118 may move fully with the entire interior area 114 and thereby create noise, for example so as to attract fish. Notably, the noise-creating apparatus 118 is isolated from contact with water that will surround the chum bobber 100, when it is used for fishing (and that can enter the lower member 104). As a result, the noise-creating apparatus 118 is protected from potential dirt, grease, grime, or other particulates or materials that could prematurely age, weaken, or render inoperable the noise-creating function of the noise-creating apparatus 118.

Details are now described regarding the lower member 104, as shown in FIGS. 6-9. In an example, the lower member 104 has an exterior wall 120, and the interior of the exterior wall 120 provides a hollow interior space 122. The exterior wall 120, like the exterior wall 112 of the upper member 102, may have a thickness in a range from 1 mm to 2.25 mm. The hollow interior space 122 is not fully enclosed, as compared to the sealed hollow interior space 114 of the upper member 102. Instead, when the upper and lower members 102 and 104 are separated from one another, the hollow interior space 122 is readily accessible from outside the lower member 104, so for example a user may place chum (not shown) into the hollow interior space 122, without the need unlike some prior art bobbers to add additional elements into an interior space so as to position or otherwise accommodate the chum, and where such additional elements consume part of the inner volume of the chum bobber and thereby prevent the use of such volume to hold yet more chum. Further, once the user adds chum into the hollow interior space 122, the user assembles the upper and lower members 102 and 104 together. Further, for example, because the hollow interior space 122 is not fully enclosed when the upper and lower members 102 and 104 are separated from each other, the entirety of the lower member 104 may be formed using an injection molding process. An outer surface of the exterior wall 120 includes at least one, and preferably multiple, holes 124 extending through the exterior wall 120. Each hole 124 may have a diameter (or major axis, if not circular) in a range from 3.25 mm to 7.5 mm. Accordingly, when chum is inserted into the hollow interior space 122, and when the chum bobber 100 is there after deposited in water, the chum may dissipate through the multiple holes 124 into the water, for example due to gravity and or the movement of the chum bobber 100 within the water. Notably, no additional and movable apparatus is included or necessary to cause the chum to dissipate in this manner, and that otherwise would complicate and increase the complexity and expense, and possibly reduce the lifespan or utility, of the chum bobber 100. The lower member 104 also includes a stem 126, extending away from the exterior wall 120. In an example, the stem 126 has a generally solid cylindrical shape, with an overall length in a range from 17 mm to 38.25 mm and a main diameter in a range from 3 mm to 7 mm. The stem 126 may be monolithically formed as part of the lower member 104, for example in the same molding (e.g., injection molding) process, and from a same material (e.g., plastic), that forms the exterior wall 120. The stem 126 also includes a notch 128, for example near the distal tip of the stem 126. The notch 128 includes a radial portion inward from the outer circumference of the stem 126 (the radial portion can be perpendicular or at an angle other than 90 degrees relative to the stem 126), and an axial portion further inward from the inward end of the radial portion. A spring 130 is axially positioned around the stem 126, and has an axial length just shorter than the stem 126. The stem 126 has a smaller diameter section located on the upper end so that a groove 132 is created in the stem 126. The spring 130 has a smaller diameter at the upper end (smaller than the stem 126 main diameter but larger than the groove 132) so that the upper end of the spring 130 positions inside of the groove 132 and is permanently affixed to the stem 126. In operation, a user may compress the spring 130, for example in the upward direction shown in FIGS. 6, 7, and 9, so as to expose the notch 128. Once the notch 128 is so exposed, the user may place a fishing line (shown later in FIG. 12) through the notch 128, and then release the spring 130, so that the released spring retains and traps the fishing line within the notch 128. Accordingly, the chum bobber 100 may be positioned in water and by pulling on the fishing line, the pulling force is translated, via the notch 128, to advance the chum bobber 100 in the water. Further, the line also may be positioned within the notch 128 so that a hook (shown later in FIG. 12) on the line can be positioned nearby the chum bobber 100. Still further, note that the combination of the stem 126 (with its notch 128) and the spring 130 allows affixation to a fishing line away from the interior of the chum bobber 100, and thereby does not introduce any additional complexity or potential wear to that interior. Additionally, unlike certain bobbers that use a fixed metal as the sole manner of retaining a fishing line, and in some cases where the metal penetrates the bobber providing points of particulate accumulation and/or eventual wear or damage, the example illustrated has a portion of the retention by the stem 126. The stem 126 does not interfere with the interior of the bobber, and from this, and also potentially by its material (e.g., plastic) will be less vulnerable to potential rust and snagging, and less intrusive to the remainder of the bobber. Further, to the extent the spring 130 becomes worn, it is more readily replaced as a removable portion of the entire unit, as compared to approaches that include an eyelet or other intricately-bent metal that is permanently affixed to the bobber.

Figure 10:
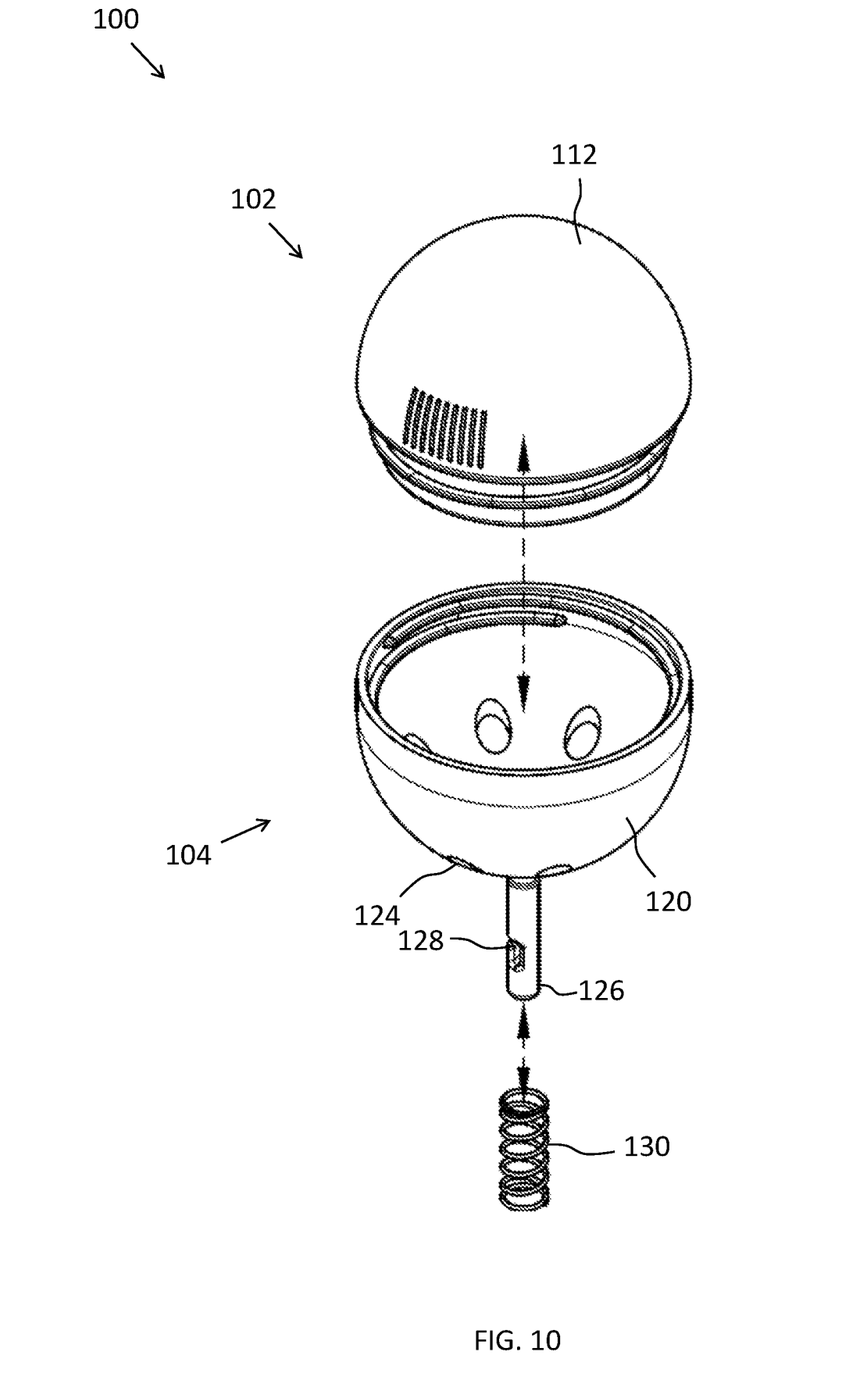
FIG. 10 illustrates the chum bobber 100 in an exploded view.
Figure 11:
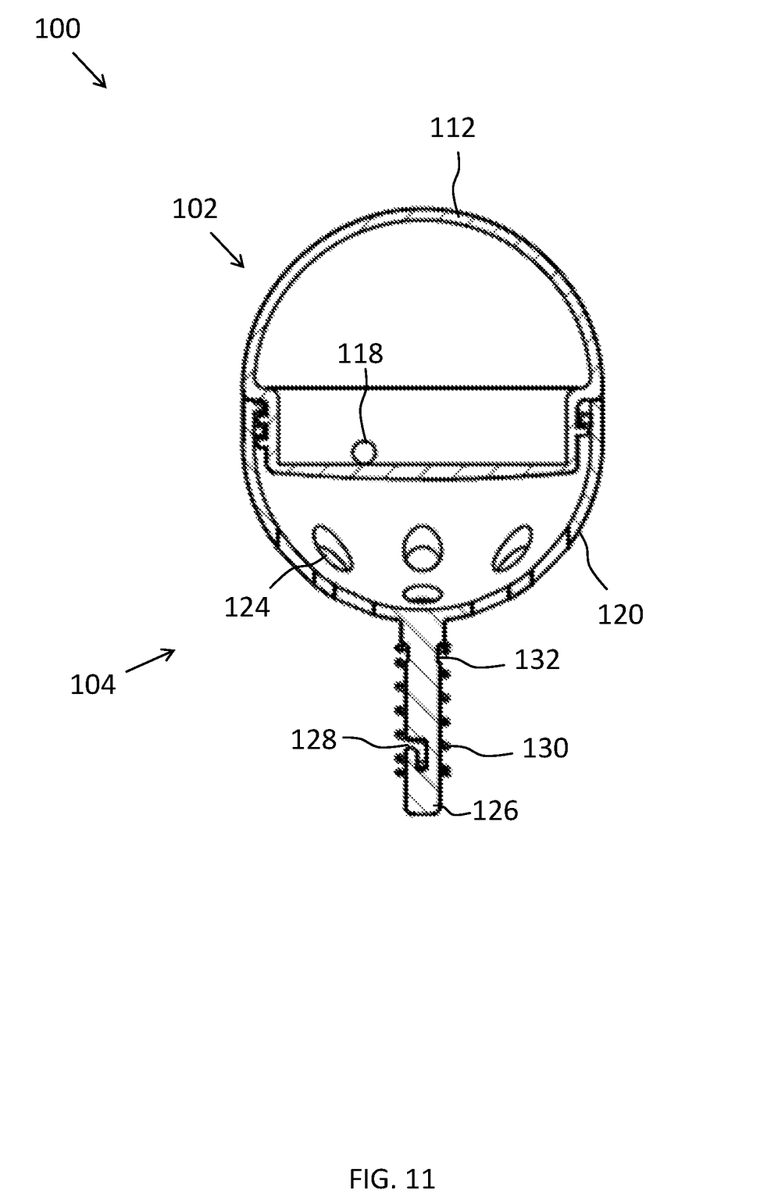
FIG. 11 illustrates a cross section of the chum bobber 100 in an assembled view.
Figure 12:
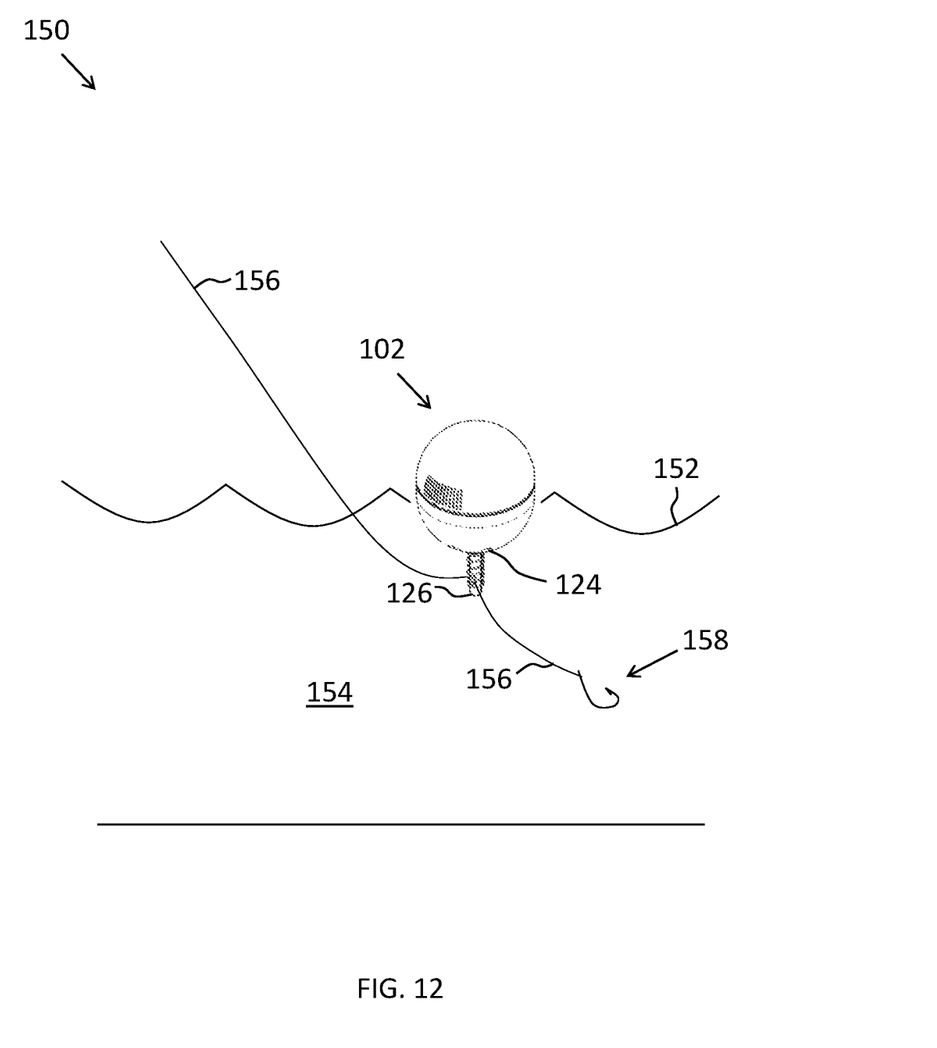
FIG. 12 illustrates an environmental example 150 of the chum bobber 100.

FIG. 10 illustrates the chum bobber 100 in an exploded view, and FIG. 11 illustrates a cross section of the chum bobber 100 in an assembled view. FIG. 12 illustrates an environmental example 150 of the chum bobber 100 along a surface 152 of water 154, with the stem 126 extending into the water 154. A fishing line 156 is attached to the chum bobber 100 as described earlier. A hook 158 also may be attached to an end of the fishing line 156, and the hook 158 may include additional bait (not shown). Accordingly, in the environmental example 150, it is assumed that the chum bobber 100 was earlier loaded with chum, so as it rests in the water 154, or is pulled along the water surface 152 by pulling on the fishing line 156, chum may disperse through the holes 124 and attract fish to the area of the hook 158.

Given the preceding, the chum bobber 100 may be used in connection with fishing. The chum bobber 100 is both a functioning bobber that floats and holds chum, which may include shrimp, dog food, or any bait a user wants to use to attract fish to their hook. The chum bobber 100 may be disassembled, so as to load chum in it, by unscrewing only two parts relating to chum (i.e., the upper and lower members 102 and 104), loading in the chum, then re-assembling (e.g., screwing) back together the two parts, completing an assembly with no moving parts in connection with distribution of the chum. Thereafter, when the chum bobber 100 is placed in water, the chum will leak into the water through the holes 124, thus attracting fish by the smell/chunks of chum in the water. The foregoing description is of exemplary and example embodiments. Further, alterations and modifications to the disclosed embodiments may be made without departing from the inventive scope. For example, while certain dimensions, or ranges of dimensions have been provided, various aspects may be applied to other sizes that can be used for fishing purposes. Accordingly, the inventive scope, as defined by the appended claims, is not limited to the described embodiments.

What is claimed is:

1. A chum bobber, comprising:
a first member comprising an exterior wall defining a maximum diameter of said first member, an integrated buoyancy chamber therein, and a first coupling apparatus, said first coupling apparatus comprising a flange with first threads thereon, said flange both having a smaller diameter than said maximum diameter of said first member and extending away from said exterior wall along an axis of said first member at a location adjacent to said maximum diameter of said first member, and wherein said integrated buoyancy chamber is formed by a gas-filled space within said exterior wall and said flange which is fully surrounded by a wall of a common material that defines said exterior wall and said flange such that said first member comprises an airtight member; and
a second member comprising a chum chamber and a second coupling apparatus for physically coupling to said first coupling apparatus, said second coupling apparatus comprising second threads, wherein said chum chamber comprises a plurality of holes, each hole of said plurality of holes passing through the second member from an interior of said chum chamber to outside said chum chamber, further wherein each said hole comprises an axis of a plurality of axes of said plurality of holes, further wherein each said axis of said plurality of axes is parallel to other axes of said plurality of axes of said plurality of holes, wherein said second member comprises a stem both monolithically formed with a curved surface of the second member and protruding away from said curved surface at a location that is surrounded by the plurality of holes, said stem comprising a notch for receiving a fishing line, and a spring axially positioned around said stem for retaining said fishing line in said notch;
wherein said flange is positioned to prevent over-progression of said first coupling apparatus into said second coupling apparatus during coupling thereof; and
wherein said first coupling apparatus and said second coupling apparatus are adapted for coupling said first member and said second member and thereby trapping chum into said second member while isolating the chum from said first member.

2. The chum bobber of claim 1 wherein said first threads of said first coupling apparatus comprises male threads, and said second threads of said second coupling apparatus comprises female threads.

3. The chum bobber of claim 1 wherein each of said first member and said second member comprises a hemispherical member.

4. The chum bobber of claim 1 wherein at least one of said first member and said second member comprises a gripping member formed onto a surface of said at least one of said first member and said second member.

5. The chum bobber of claim 1 wherein said first member comprises a noise-generating apparatus.

6. The chum bobber of claim 5 wherein said noise-generating apparatus is within said integrated buoyancy chamber and is isolated from water during use of said chum bobber.

7. The chum bobber of claim 5 wherein said noise-generating apparatus comprises one or more loose members.

8. The chum bobber of claim 5 wherein said noise-generating apparatus comprises one or more spheres.

9. The chum bobber of claim 1 wherein each said hole is circular in shape, a diameter of each said hole extending orthogonally from said axis of each said hole.

10. The chum bobber of claim 9, wherein said second member has an opening, proximate said second coupling apparatus, for receiving the chum into said chum chamber, and said opening has a larger diameter than said diameter of each said hole.

\* \* \* \* \*